United States Patent
Hayashi et al.

(10) Patent No.: US 7,828,357 B2
(45) Date of Patent: Nov. 9, 2010

(54) WELDING ARRANGEMENT FOR VEHICLE BODY PANELS

(75) Inventors: Noboru Hayashi, Wako (JP); Kazuyoshi Doira, Wako (JP); Masaaki Fujimoto, Wako (JP); Takayuki Yamada, Wako (JP); Mitsuhiko Ueki, Wako (JP); Kouji Furudate, Wako (JP); Takuji Ishimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 229 days.

(21) Appl. No.: 11/928,565

(22) Filed: Oct. 30, 2007

(65) Prior Publication Data

US 2008/0178467 A1 Jul. 31, 2008

(30) Foreign Application Priority Data

Jan. 30, 2007 (JP) ............................. 2007-019172
Jan. 30, 2007 (JP) ............................. 2007-019182

(51) Int. Cl.
*B62D 27/00* (2006.01)
(52) U.S. Cl. .......................................... 296/29; 296/30
(58) Field of Classification Search .................. 296/29, 296/146.5, 210, 191, 30, 193.01, 213; 228/47.1; 29/428, 525.14, 897.2
See application file for complete search history.

(56) References Cited

U.S. PATENT DOCUMENTS

| | | | | |
|---|---|---|---|---|
| 2,878,552 A | | 3/1959 | Wirt | |
| 5,660,426 A | * | 8/1997 | Sugimori et al. | 296/187.05 |
| 5,681,076 A | * | 10/1997 | Yoshii | 296/210 |
| 5,762,392 A | * | 6/1998 | Suga | 296/39.1 |
| 5,860,694 A | * | 1/1999 | Seefried et al. | 296/29 |
| 5,873,618 A | * | 2/1999 | Ejima | 296/30 |
| 6,073,992 A | * | 6/2000 | Yamauchi et al. | 296/203.01 |
| 6,283,541 B1 | * | 9/2001 | Kim | 296/29 |
| 6,315,350 B1 | * | 11/2001 | Nakane et al. | 296/187.05 |
| 6,328,376 B2 | * | 12/2001 | Son | 296/30 |
| 6,692,065 B2 | * | 2/2004 | Yamamoto et al. | 296/205 |
| 7,249,797 B2 | * | 7/2007 | Wolkersdorfer et al. | 296/30 |
| 7,445,269 B2 | * | 11/2008 | Yustick et al. | 296/187.01 |

FOREIGN PATENT DOCUMENTS

| | | |
|---|---|---|
| DE | 100 48 233 | 4/2002 |
| JP | 7-132855 | 5/1995 |
| JP | 2000-272541 | 10/2000 |
| JP | 2003-145279 | 5/2003 |

* cited by examiner

*Primary Examiner*—Kiran B. Patel
(74) *Attorney, Agent, or Firm*—Rankin, Hill & Clark LLP

(57) ABSTRACT

An aluminum roof outer panel (2) is spot welded to a roof side rail (3) consisting of galvanized steel sheet. The outer panel (4) of the roof side rail is made of galvannealed steel sheet that has a favorable property but cannot be favorably welded to the aluminum roof outer panel, but the inner panel (5, 6) of the roof side rail is made of non-galvannealed steel sheet that can be favorably welded to the aluminum roof outer panel. Flanges of the outer panel (4) and inner panel (5, 6) overlap each other, and the flange of the outer panel is provided with a plurality of notches (11) along an edge of the outer panel. A corresponding flange of the roof outer panel is welded to the parts of the inner panel exposed by the notches of the outer panel.

14 Claims, 7 Drawing Sheets

WELDING ARRANGEMENT FOR VEHICLE BODY PANELS

TECHNICAL FIELD

The present invention relates to a welding arrangement for vehicle body panels, and in particular for a spot welding arrangement for joining vehicle body panels made of aluminum alloy and steel, respectively.

BACKGROUND OF THE INVENTION

There is a growing demand to use body panels made of various aluminum alloys to minimize the weight of the vehicle body. However, because body panels made of aluminum alloy may not be able to provide an adequate vehicle body strength by themselves, it has been proposed to use steel panels for major frame components and selectively use body panels made of aluminum alloy only in parts such as a roof outer panel that do not require a high mechanical strength and have large surface areas.

Galvannealed steel sheet is also a preferred material for vehicle body outer panels because of its high corrosion resistance and its capability to wear a highly smooth paint coating, but is known to form a relatively poor bonding when spot welded to aluminum sheet.

As a technology for ensuring a high welding strength between sheets made of two different metallic materials such as aluminum and steel materials, it is known to interpose a clad metal sheet consisting of two layers of aluminum and steel materials that are firmly joined together by rolling or the like between the sheets made of different materials that are desired to be joined together as proposed in Japanese patent No. 3355790. This ensures a high spot welding strength, but has the disadvantage to require the clad metal sheet as an additional component that adds to the cost.

Another problem when joining sheet metal components is galvanic corrosion which is caused when electrolyte such as rain water seeps into a gap between members made of different metallic materials. Japanese patent laid open publication No. 2000-272541 proposes a method for preventing galvanic corrosion in a vehicle body. In this method, non-through type rivets are used for joining two panel members, and a sealant is applied to parts remote from the rivets. However, the use of rivets requires a special piece of equipment which is otherwise unnecessary, and this adds to the manufacturing cost.

BRIEF SUMMARY OF THE INVENTION

In view of such problems of the prior art, a primary object of the present invention is to provide an arrangement for welding vehicle body panels made of different sheet metal materials including those that cannot be favorably welded to each other without increasing the number of component parts.

A second object of the present invention is to provide a welding arrangement for joining a vehicle body panel made of aluminum with another vehicle body panel made of steel sheet in a highly secure manner.

A third object of the present invention is to provide a spot welding arrangement for joining a vehicle body panel made of aluminum with another vehicle body panel made of galvannealed steel sheet.

A fourth object of the present invention is to provide a spot welding arrangement for joining vehicle body panels made of different metallic materials without incurring the problem of galvanic corrosion.

According to the present invention, at least part of such objects can be accomplished by providing a welding arrangement for joining a first vehicle body member including a first outer panel made of a first sheet metal material and a second vehicle body member including a second outer panel made of a second sheet metal material that cannot be favorably welded to the first outer panel and an inner panel made of a third sheet metal material that can be favorably welded to the first outer panel and at least partly overlapping with the second outer panel, wherein: the overlapping part of the second outer panel is provided with a notch exposing a part of the inner panel, and the first outer panel is welded, for instance spot welded to the exposed part of the inner panel.

Thereby, the first vehicle body member can be joined to the second vehicle body member by welding the first outer panel to the inner panel which can be favorably welded to the first outer panel, instead of the second outer panel which cannot be favorably welded to the first outer panel. The second outer panel and inner panel may be joined by welding or other means before joining the first vehicle body member and second vehicle body member with each other. Also, this arrangement can be implemented by using existing facilities for assembling vehicle body members without requiring any additional manufacturing facility. Typically, the first sheet metal material consists of aluminum or aluminum alloy, and the second sheet metal consists of galvannealed steel sheet which has favorable properties for use in vehicle body components but is not suitable for welding with aluminum sheet. The third sheet metal consists of non-galvannealed steel sheet which may be hot-dip galvanized steel sheet, electrogalvanized steel sheet or simple non-galvanized steel sheet.

According to a preferred embodiment of the present invention, the inner panel comprises two layers of sheet metal (a stiffener and an inner panel), and the layer adjacent to the second outer panel (the stiffener) consists of non-galvannealed steel sheet. The projection may be, for instance, rectangular in shape, and substantially complementary to the notch in shape.

The present invention also provides a favorable sealing arrangement in which an upper part of the projection is welded to the first outer panel, and a part of the inner panel surrounding the projection defines a recess in cooperation with a peripheral edge of the notch that receives a sealant therein. Typically, the second outer panel is provided with a plurality of notches along an edge thereof, and the sealant is applied as a strip that extends along and over an inner peripheral line of the notches in parallel with the edge of the second outer panel.

In particular, if the exposed part of the inner panel is provided with a projection having a height slightly greater than a thickness of the second outer panel, the second outer panel may be electrically insulated from the first outer panel via a layer of the sealant so that galvanic corrosion in this part can be favorably avoided.

According to an alternate embodiment of the present invention, the second outer panel comprises two layers of sheet metal (an outer panel and a stiffener), and the inner panel consists of non-galvannealed steel sheet so that the first outer panel may be welded to the inner panel through a notch formed in the second outer panel across the two layers.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
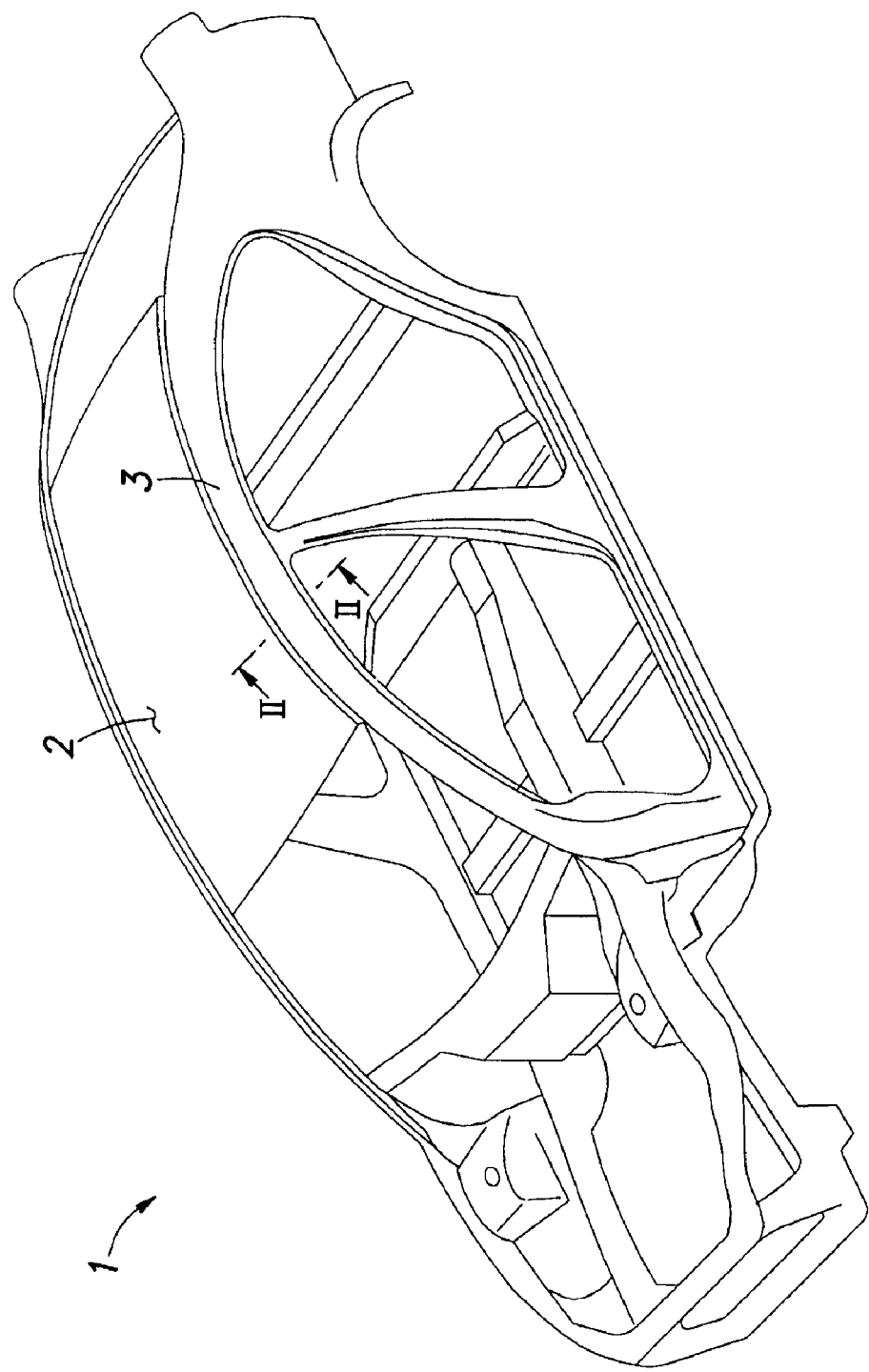
FIG. 1 is a simplified perspective view of a vehicle body to which the present invention is applied.

FIG. 1 shows an automotive vehicle body embodying the present invention. The vehicle body 1 comprises a roof outer panel 2 made of 6,000 series aluminum alloy, for instance, and a pair of roof side rails 3 each consisting of a plurality of sheet metal components and joined to a corresponding side edge of the roof outer panel 2.

Figure 2:
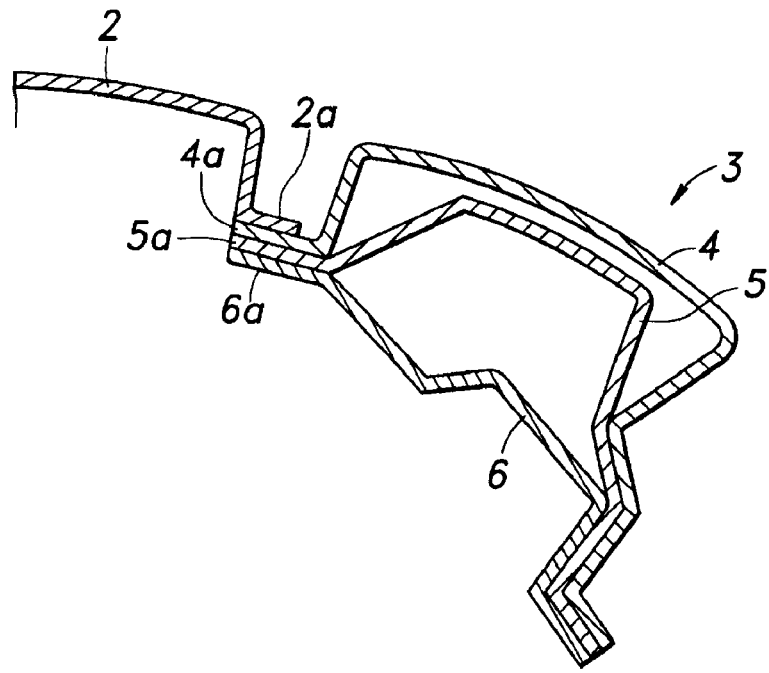
FIG. 2 is a sectional view taken along line II-II of FIG. 1.

As shown in FIG. 2, each roof side rail 3 consists of an outer panel 4, a stiffener 5 and an inner panel 6. These components are provided with lateral flanges 4a, 5a and 6a on each lateral side that are overlaid one another, and are jointly spot welded at the lateral flanges on each side. One of the side edges of the roof side rail 3 is welded to a corresponding lateral flange 2a of the roof outer panel 2 thereby forming a vehicle roof.

In this roof side rail 3, the outer panel 4 is made of galvannealed steel sheet while the stiffener 5 and inner panel 6 are made of hot-dip galvanized or electrogalvanized steel sheet (if desired, may also be made of simple non-galvanized steel sheet). In particular, the inner panel 6 which does not directly contact the flange portion 2a of the roof outer panel 2 may consist of non-galvanized steel sheet.

Figure 3:
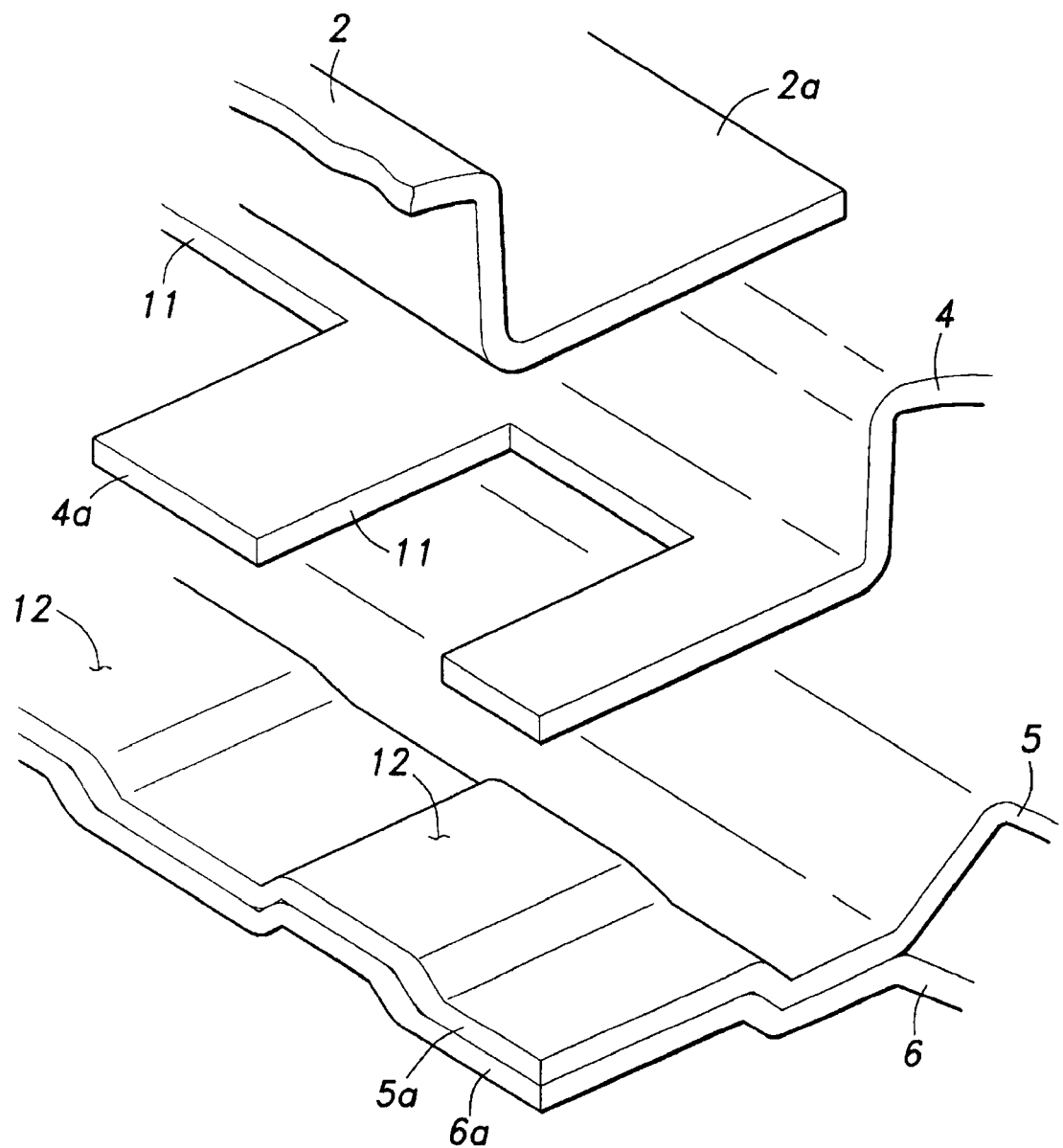
FIG. 3 is a fragmentary perspective view showing the welding arrangement embodying the present invention.

As shown in FIG. 3, the flange portion 4a of the outer panel 4 of the roof side rail 3 is provided with a plurality of rectangular notches 11 at a regular interval along the outer edge thereof. The flange portions 5a and 6a of the stiffener 5 and inner panel 6 are provided with upward projections 12 that fit into the rectangular notches 11 of the flange portion 4a of the outer panel 4. The height of these upward projections 12 is substantially equal to the thickness of the outer panel 4.

Figure 4A:
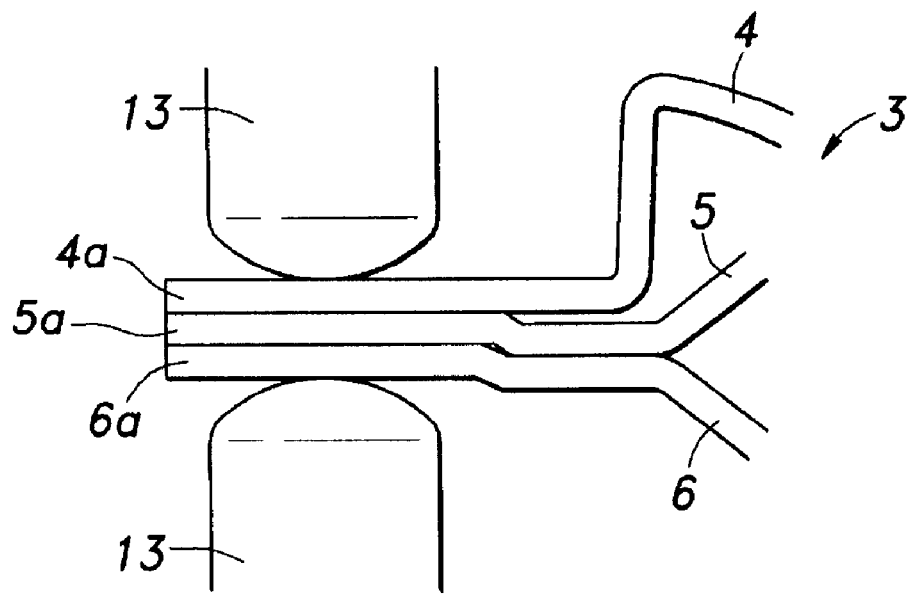
FIG. 4a is a simplified sectional view showing the process of welding together three panel members to form a roof side rail.

The process of spot welding the roof outer panel 2 to the roof side rail 3 is now described in the following. First of all, the flange 5a of the stiffener 5 is placed on the corresponding flange 6a of the inner panel 6, and the flange 4a of the outer panel 4 is placed on the flange 5a of the stiffener 5 with the projections 12 aligned with the notches 11. A pair of electrode tips 13 of a spot welder are applied to the outer surfaces of the flanges 4a and 6a of the outer panel 4 and inner panel 6, respectively, and the three flanges 4a, 5a and 6a are welded together as illustrated in FIG. 4a. More specifically, the upper electrode tip 13 is applied to a part of the flange 4a of the outer panel 4 which does not correspond to any of the notches 11.

Figure 5:
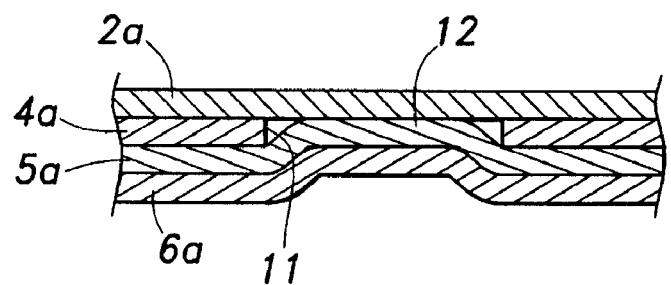
FIG. 5 is a sectional view showing the joint between the roof outer panel to the roof side rail.
Figure 4B:
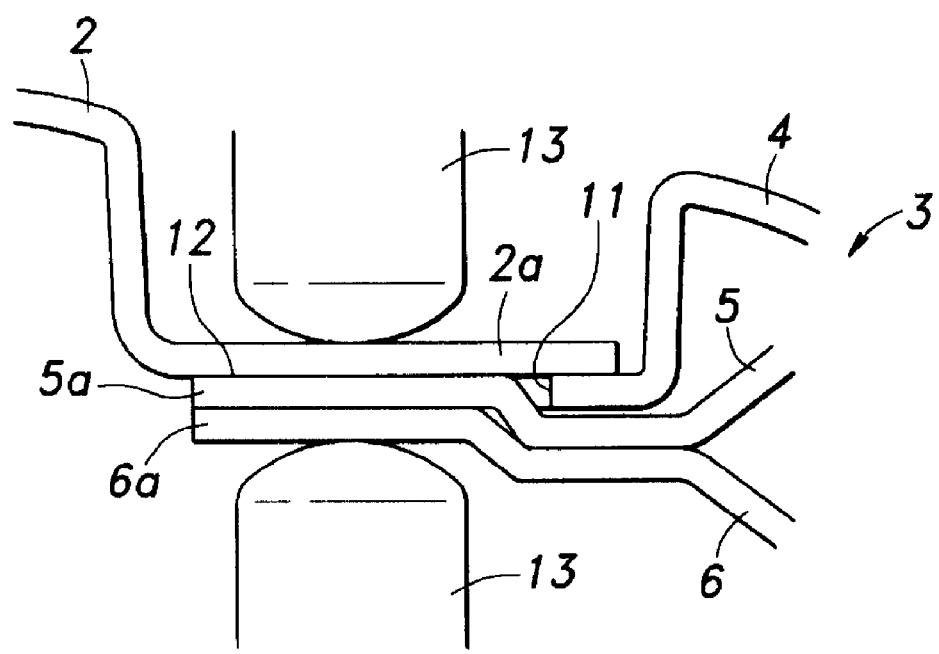
FIG. 4b is a simplified sectional view showing the process of welding a roof outer panel to the roof side rail.

Then, the flange 2a of the roof outer panel 2 is placed on the flange 4a of the outer panel 4 of the roof side rail 3, and the electrode tips 13 of the spot welder are applied to the outer surfaces of the flanges 6a and 2a of the inner panel 6 and roof outer panel 2, respectively, and the three flanges 2a, 5a and 6a are welded together as illustrated in FIG. 4b. In particular, the upper electrode tip 13 is applied the part of the flange 2a of the roof outer panel 2 that corresponds to the notches 11 of the outer panel 4 or the part that corresponds to the projections 12 of the roof side rail 3. Thereby, the flange 2a of the roof outer panel 2 is welded to the upper surface of each projection 12 that is exposed by the corresponding notch 11. Thereby, the roof side rail 3 is completed as illustrated in FIG. 5.

In this case, the roof outer panel 2 is welded to the stiffener 5 which is made of hot-dip galvanized or electrogalvanized steel sheet. The ductility ratio (peel strength/shear strength) of a weld between a 6,000 series aluminum alloy sheet and a non-galvannealed steel sheet (hot-dip galvanized or electrogalvanized steel sheet) is about 0.35, and this is significantly greater than the ductility ratio of a weld between a pair of steel sheets which is about 0.30. Therefore, a weld of an adequate mechanical strength can be achieved according to the present invention as compared to the case where a weld is formed between the roof outer panel 2 made of 6,000 series aluminum alloy and the outer panel 4 made of galvannealed steel sheet. Therefore, the present invention eliminates the need for additional structural members, and contributes to the reduction in the number of component parts.

In the foregoing embodiment, the aligning of the outer panel 4, stiffener 5 and inner panel 6 is simplified by the positioning action of the notches 11 and projections 12, and this facilitates the manufacturing process of the roof side rail 3. In particular, if the height of each projection 12 is selected to be substantially similar to the plate thickness of the roof side rail outer panel 4, because the flange surface of the roof side rail 3 onto which the flange 2a of the roof outer panel abuts may consist of a substantially flat surface, the bottom surface of the groove formed jointly by the flange 2a of the roof outer panel 2 and the roof side rail outer panel 4 can be made substantially flat, and this prevents water from being trapped on the bottom surface of the groove. Also, by selecting the height of each projection 12 to be substantially similar to the plate thickness of the roof side rail outer panel 4, the gap between the inner peripheral edge of each notch 11 and the outer periphery of the corresponding projection 12 may be used as a reservoir for a sealant.

Figure 6:
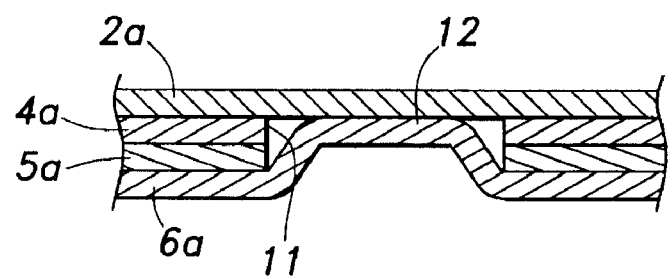
FIG. 6 is a view similar to FIG. 5 showing a modified embodiment of the present invention.

FIG. 6 shows a modified embodiment, in which the notches 11 are provided not only in the flange 4a of the outer panel 4 but also in the flange 5a of the stiffener a at positions corresponding to those of the outer panel 4. The projections 11 are formed only in the flange 6a of the inner panel 6, and have a height corresponding to the combined thickness of the outer panel 4 and stiffener 5. In this case, the flanges 4a, 5a and 6a of the roof side rail panels 4, 5 and 6 are spot welded in the parts where the notches 11 are absent, and the thus formed roof side rail 3 is welded to the roof outer panel 2 by welding the edge 2a of the roof outer panel 2 to the exposed parts of the flange 6a of the inner panel 6a. In this case, the roof outer panel 12 is made of aluminum or aluminum alloy, and the inner panel 6 is made of non-galvannealed steel sheet which can be favorably welded to the roof outer panel 2 made of aluminum material while the outer panel 4 (if desired, the stiffener 5 also) may be made of galvannealed steel sheet.

Figure 7:
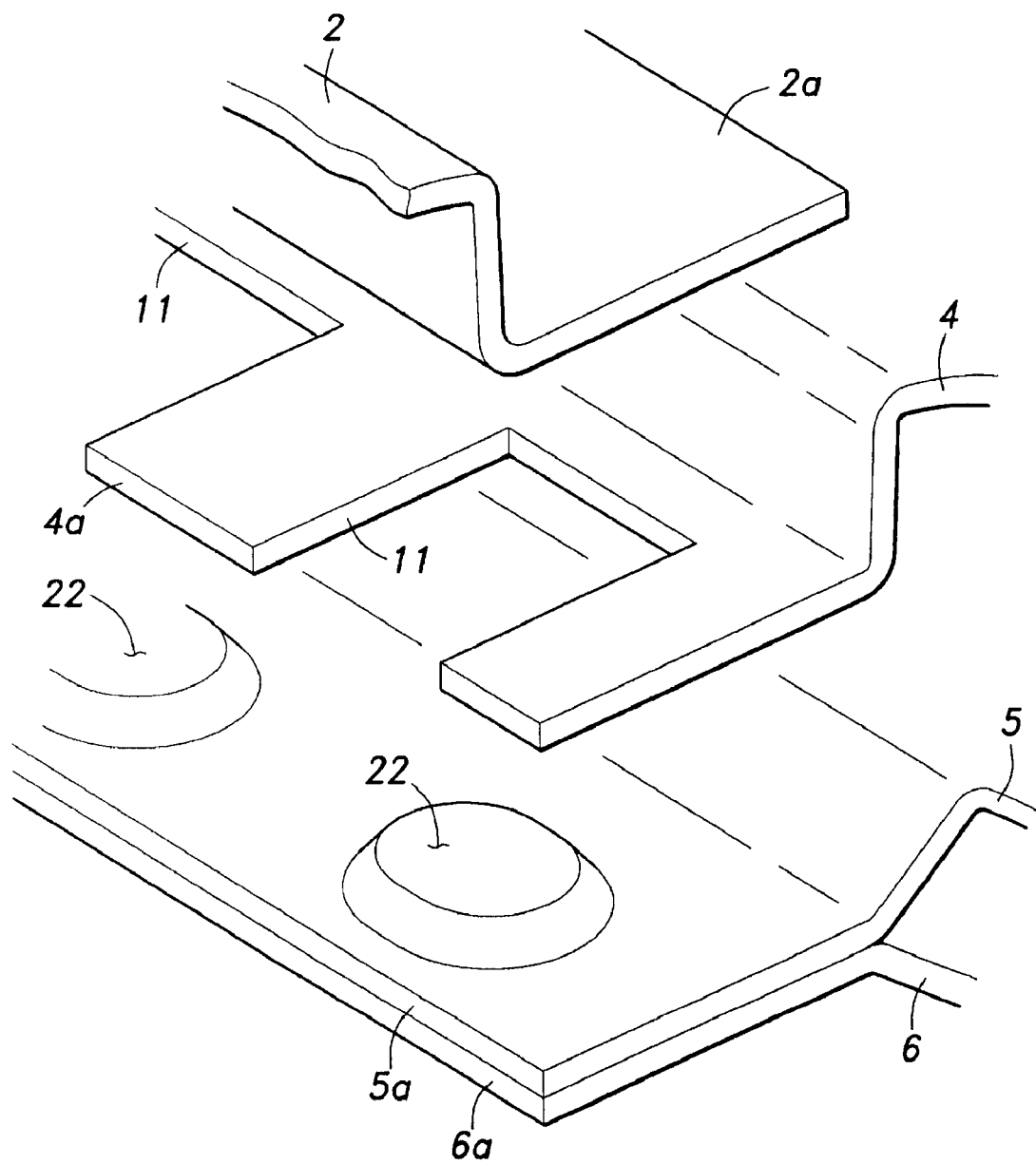
FIG. 7 is a view similar to FIG. 3 showing a second embodiment of the present invention.

FIG. 7 shows a second embodiment of the present invention. In this roof side rail 3, the outer panel 4 is made of galvannealed steel sheet while the stiffener 5 and inner panel 6 are made of hot-dip galvanized or electrogalvanized steel sheet. In this case also, the stiffener 5 and inner panel 6, in particular the inner panel 6 which does not directly contact the flange portion 2a of the roof outer panel 2, may also consist of simple non-galvanized steel sheet.

As shown in FIG. 7, the flange portion 4a on the roof panel side of the outer panel 4 of the roof side rail 3 is provided with a plurality of rectangular notches 11 at a regular interval along the outer edge thereof. The corresponding flange portions 5a and 6a of the stiffener 5 and inner panel 6 are provided with upward projections 22 that fit into the rectangular notches 11 of the flange portion 4a of the outer panel 4. In this case, each projection 22 consists of a part-spherical projection which is circular in shape as seen in plan view. The height of these upward projections 22 is slightly greater than the thickness of the outer panel 4.

Figure 8A:
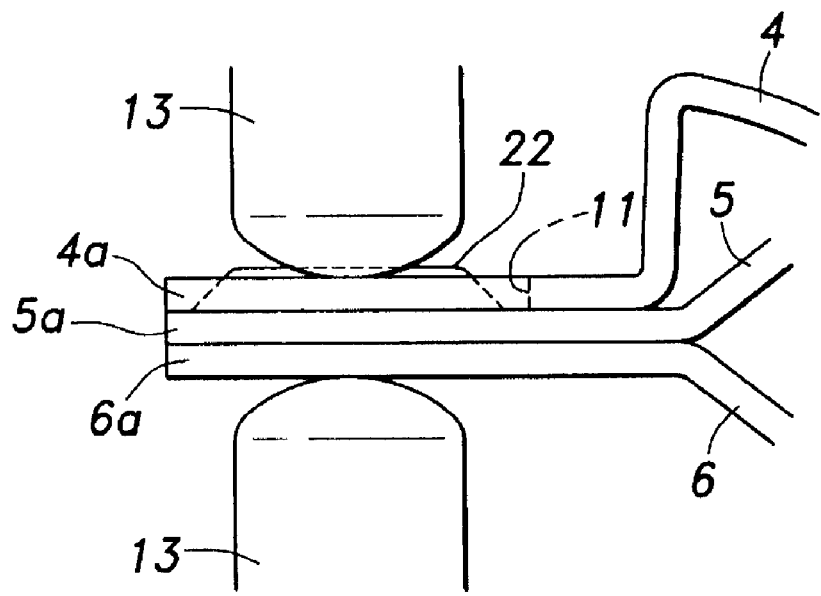
FIG. 8a is a view similar to FIG. 4a showing the second embodiment of the present invention.

The process of spot welding the roof outer panel 2 to the roof side rail 3 is now described in the following. First of all, the flange 5a of the stiffener 5 is placed on the corresponding flange 6a of the inner panel 6, and the flange 4a of the outer panel 4 is placed on the flange 5a of the stiffener 5 with the projections 22 aligned with the notches 11. A pair of electrode tips 13 of a spot welder are applied to the outer surfaces of the flanges 4a and 6a of the outer panel 4 and inner panel 6, respectively, and the three flanges 4a, 5a and 6a are welded together as illustrated in FIG. 8a. More specifically, the upper electrode tip 13 is applied to the part of the flange 4a of a part of the outer panel 4 which does not correspond to the notch 11.

Figure 9:
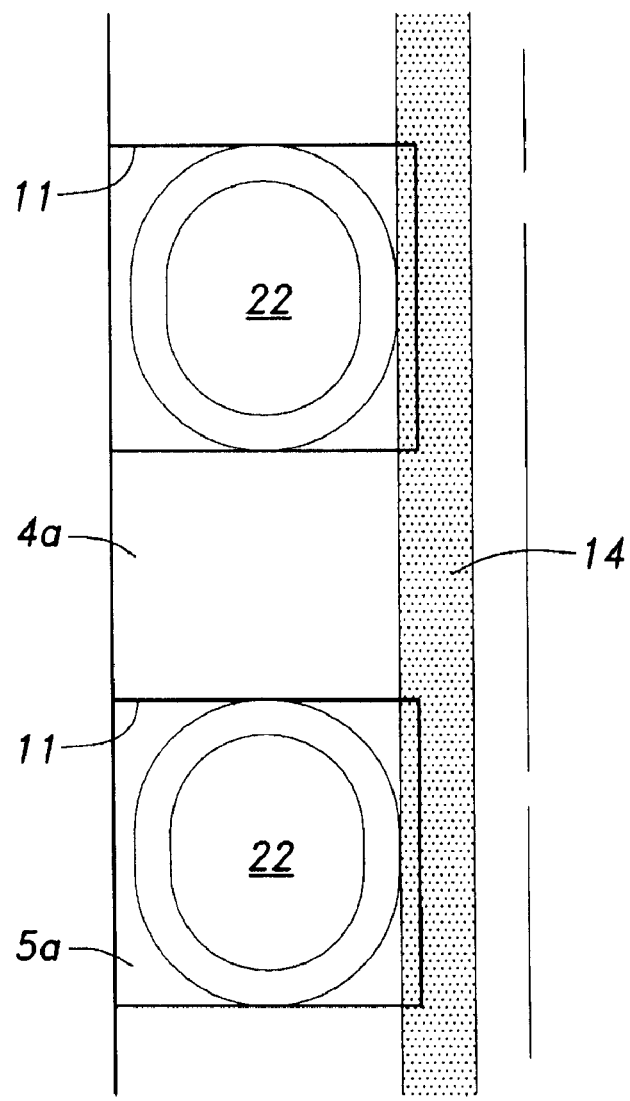
FIG. 9 is a plan view showing the sealant deposited on the roof side rail in the second embodiment of the present invention.
Figure 10:
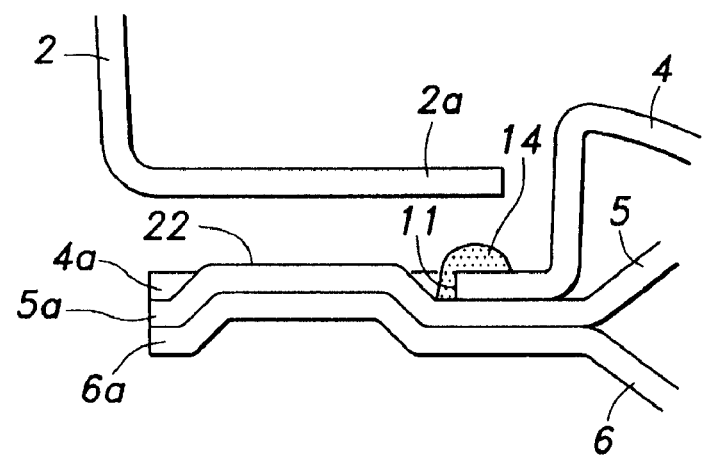
FIG. 10 is a vertical sectional view showing the process of joining the roof outer panel to the roof side rail in the second embodiment of the present invention.

Then, as shown in FIG. 9, a sealant 14 is applied to the upper surface of the flange 4a of the outer panel 4 as a strip that continuously extends along and over the inner edges of the notches 11. Therefore, as best shown in FIG. 10, the sealant 14 is present not only in the recess defined in each notch between the inner edge of the notch 11 and the opposing wall of the projection 22 but also on the part of the upper surface of the flange 4a of the outer panel 4 immediately inward of the inner edges of the notches 11.

When the flange 2a of the roof outer panel 2 is placed on the flange 4a of the outer panel 4 of the roof side rail 3, the sealant 14 is interposed between the lower surface of the flange 2a of the roof outer panel 2 and the upper surface of the flange 4a of the outer panel 4 as film on the one hand and is filled into the recess defined in each notch 11 on the other hand.

Figure 8B:
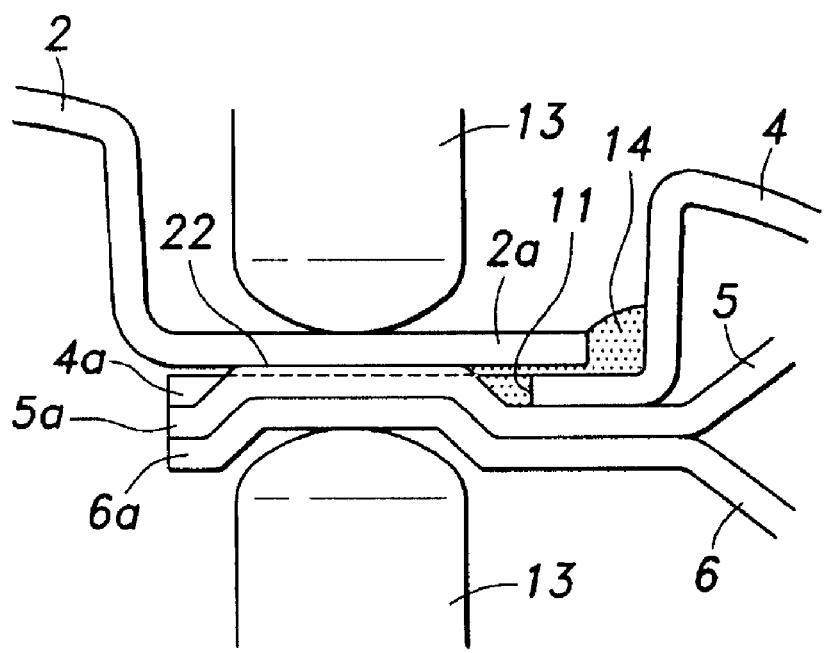
FIG. 8b is a view similar to FIG. 4b showing the second embodiment of the present invention.

Thereafter, the electrode tips 13 of the spot welder are applied to the outer surfaces of the flanges 6a and 2a of the inner panel 6 and roof outer panel 2, respectively, and the three flanges 2a, 5a and 6a are welded together as illustrated in FIG. 8b. In particular, the upper electrode tip 13 is applied the part of the flange 2a of the roof outer panel 2 that corresponds to any of the notches 11 of the outer panel 4 or the part that corresponds to any of the projections 12 of the roof side rail 3. Thereby, the flange 2a of the roof outer panel 2 is welded to the upper surface of each projection 22 that is exposed by the corresponding notch 11. Thereby, the roof side rail 3 is completed.

In this case also, the substantially same welding strength similar to that of the first embodiment was achieved. Furthermore, the sealant 14 continuously extends as a strip along and over the inner edges of the notches 11. In particular, the sealant 14 is interposed between the flanges 2a and 4a of the roof outer panel 2 and outer panel 4, and is filled into the recess in the notches 11 in the region covered by this strip. Thereby, the electric contact between the roof outer panel 2 and outer panel 4 is avoided so that galvanic corrosion is minimized. The sealant 14 that is filled into the recesses in the notches 11 prevents intrusion of moisture into the gap between the roof outer panel 2 and outer panel 4.

The shape of each projection 12 is not limited to the rectangular shape and circular shape used in the foregoing embodiments, but may also be polygonal, elliptic or the like as long as it is suitable for the electrode tip 13 of a welder to adequately press upon. The shape of each notch 11 is also not limited to the rectangular shape used in the foregoing embodiments, but may be rounded or otherwise deviate from the rectangular shape as long as it does not interfere with the projection 12.

In the illustrated embodiments, the projections 12, 22 were formed on the side of the roof side rail 3, but, if desired, may also be formed on the side of the roof outer panel 2 while the flanges 5a and 6a of the stiffener 5 and inner panel 6 are (or the flange 6a of the inner panel 6) substantially flat.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application are incorporated in this application by reference.

The invention claimed is:

1. A welding arrangement for joining a first vehicle body member including a first outer panel made of a first sheet metal material and a second vehicle body member including a second outer panel made of a second sheet metal material that cannot be favorably welded to the first outer panel and an inner panel assembly having an inner panel and stiffener both made of a third sheet metal material that can be favorably welded to the first outer panel and a part of the second outer panel at least partly overlapping the inner panel assembly, wherein:

the overlapping part of the second outer panel is provided with a notch exposing a part of the stiffener of the inner panel assembly, and the first outer panel is welded to the exposed part of the stiffener of the inner panel assembly so that the first vehicle body member can be joined to the second vehicle body member by welding the first outer panel to the inner panel assembly.

2. The welding arrangement according to claim 1, wherein the first sheet metal material consists of aluminum or aluminum alloy.

3. The welding arrangement according to claim 1, wherein the second sheet metal consists of galvannealed steel sheet.

4. The welding arrangement according to claim 1, wherein the third sheet metal consists of non-galvannealed steel sheet.

5. The welding arrangement according to claim 1, wherein the exposed part of the stiffener of the inner panel assembly is provided with a projection having a height corresponding to a thickness of the second outer panel.

6. The welding arrangement according to claim 1, wherein the inner panel comprises two layers of sheet metal, and the layer adjacent to the second outer panel consists of non-galvannealed steel sheet.

7. The welding arrangement according to claim 5, wherein the projection is substantially complementary to the notch in shape.

8. The welding arrangement according to claim 1, wherein the exposed part of the inner panel is provided with a projection, and an upper part of the projection is welded to the first outer panel, a part of the inner panel surrounding the projection defining a recess in cooperation with a peripheral edge of the notch that receives a sealant therein.

9. The welding arrangement according to claim 8, wherein the second outer panel is provided with a plurality of notches along an edge thereof, and the sealant is applied as a strip that extends along and over an inner peripheral line of the notches in parallel with the edge of the second outer panel.

10. The welding arrangement according to claim 9, wherein the projection has a height slightly greater than a thickness of the second outer panel.

11. The welding arrangement according to claim 1, wherein the first outer panel is welded to the inner panel assembly by spot welding.

12. A welding arrangement for joining a roof outer panel of a vehicle body to a roof side rail, the roof outer panel made of a first sheet metal material and the roof side rail includes an outer panel and an inner panel assembly, the roof side rail outer panel made of a second sheet metal material that cannot be favorably welded to the roof outer panel and the inner panel assembly includes a stiffener and an inner panel, at least one of the stiffener and inner panel being made of a third sheet metal material that can be favorably welded to the first outer panel and the inner panel assembly at least partly overlapping with a part of the roof side rail outer panel, wherein:

the overlapping part of the roof side rail outer panel is provided with a notch exposing a part of the inner panel assembly, and the roof outer panel is welded to the exposed part of the inner panel assembly.

13. The welding arrangement according to claim 12, wherein the exposed part of the inner panel assembly is provided with a projection having a height corresponding to a thickness of the roof side rail outer panel.

14. The welding arrangement according to claim 13, wherein the projection is substantially complementary to the notch in shape.

* * * * *